May 20, 1930.  J. F. O'CONNOR  1,758,967
FRICTION SHOCK ABSORBING MECHANISM
Filed Feb. 27, 1928    2 Sheets-Sheet 2
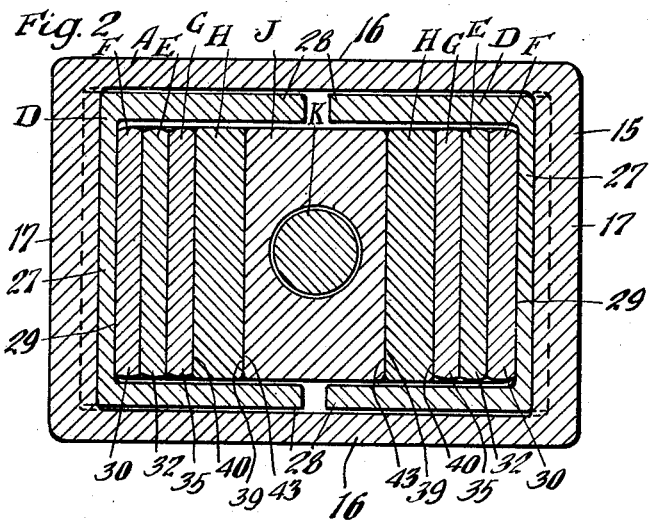
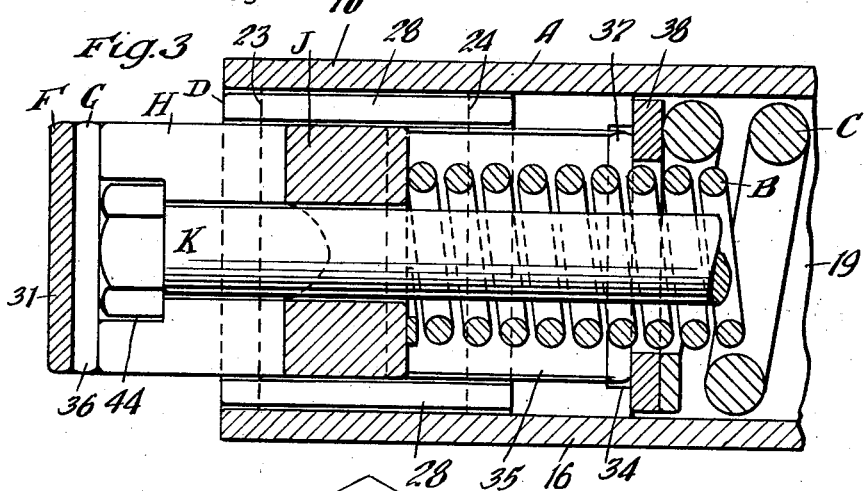
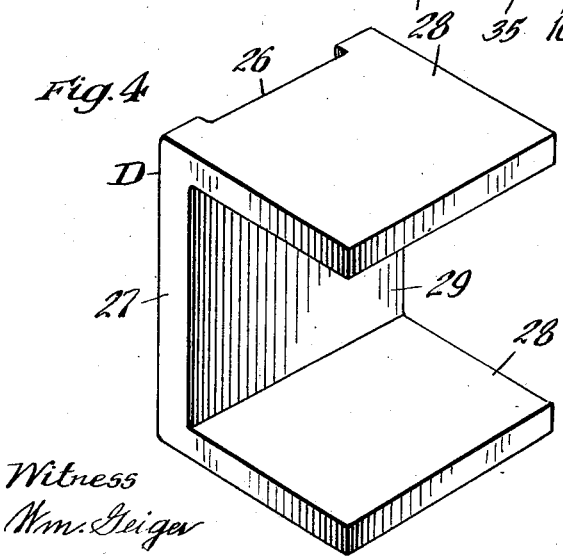
Witness
Wm. Geiger
Inventor
John F. O'Connor
By Joseph Harris
His Atty.

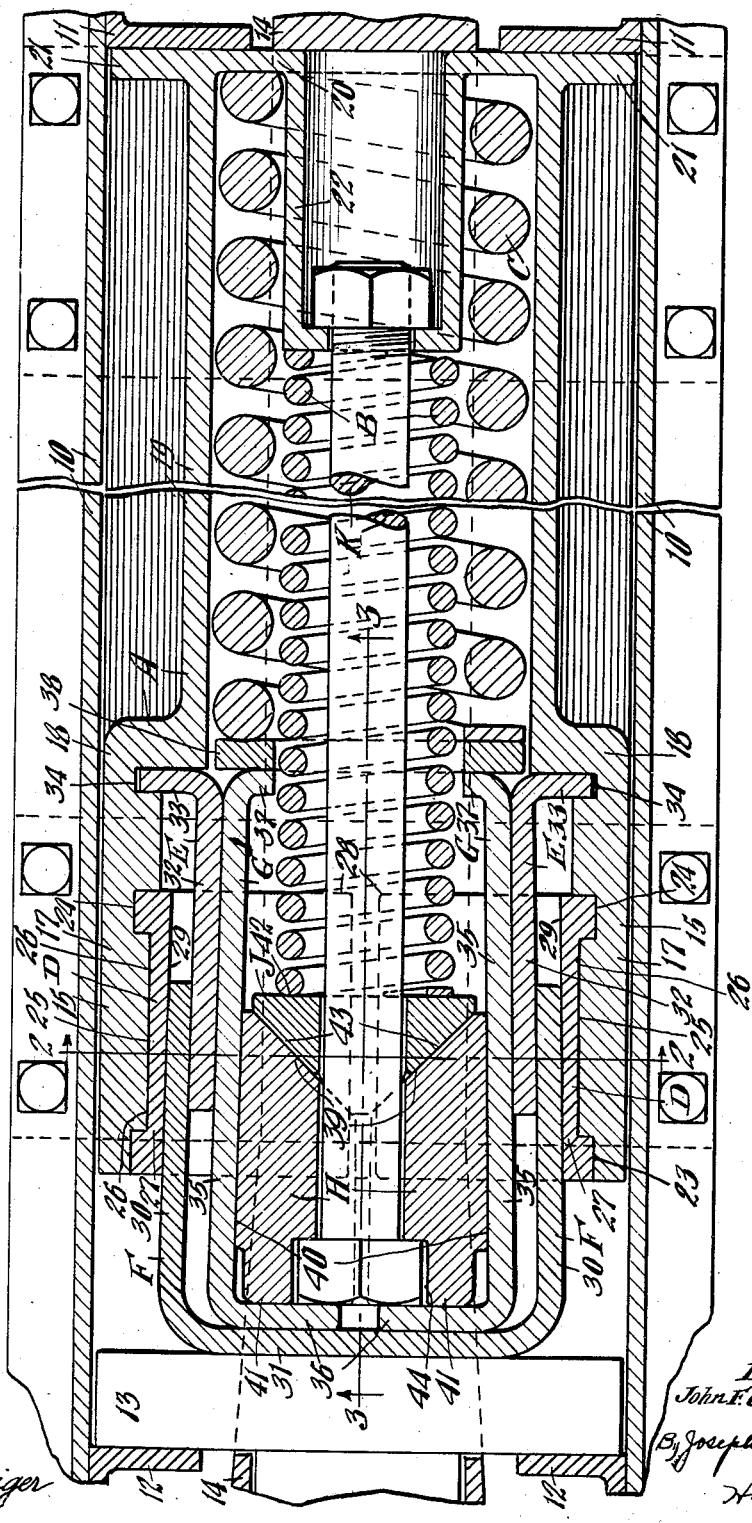

Patented May 20, 1930

1,758,967

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

FRICTION SHOCK-ABSORBING MECHANISM

Application filed February 27, 1928. Serial No. 257,124.

This invention relates to improvements in friction shock absorbing mechanisms.

One object of my invention is to provide a friction shock absorbing mechanism of the intercalated friction plate type which is particularly adapted for a long compression stroke.

Another object of my invention is to provide a friction plate type gear having a relatively long compression stroke wherein the lateral pressure-creating wedge system is always disposed within the friction shell and all tendency to spread or distort the mouth of the shell is eliminated.

A still further object of my invention is to provide a friction shock absorbing device of the intercalated friction plate type wherein are employed multiple spring units, one of which is directly cooperable with certain of the movable friction plates and another is directly cooperable with the wedge pressure-creating system.

Other objects of the invention will more clearly appear from the description and claims hereinafter following.

In the drawings forming a part of this specification, Fig. 1 is a horizontal longitudinal sectional view of a portion of a railway car showing my improvements in connection therewith. Fig. 2 is a vertical transverse sectional view of the improved shock absorbing device proper corresponding to the line 2—2 of Fig. 1. Fig. 3 is a vertical longitudinal sectional view corresponding to the line 3—3 of Fig. 1, parts being broken away to better accommodate the figure on the sheet. And Fig. 4 is a detail perspective of one of the liners employed with the friction shell.

In said drawings the improved shock absorbing mechanism is shown associated with channel draft sills 10—10 of the usual form, said sills having rear stop lugs 11—11 and front stop lugs 12—12 secured thereto. A front follower 13 of usual construction is indicated, and a yoke 14.

The improved shock absorbing mechanism proper, comprises a combined friction shell and spring cage casting A; a spring resistance consisting of two units B and C; liners D—D; stationary friction plates E—E; outer movable friction plates F—F; inner movable friction plates G—G; pressure-transmitting wedge friction shoes H—H; a wedge spring follower J; and a retaining bolt K.

The shell and cage casting A is formed with a friction shell proper 15 at its front end, said shell being of rectangular cross section having top and bottom walls 16—16 and side walls 17—17. At the inner end of the shell section 15, the casting is provided with outwardly facing inwardly extending transverse shoulders 18—18, the latter being located at the front end of the spring cage section 19 which is of reduced width, as compared with the friction shell and as clearly shown in Fig. 1. The cage 19 has an integral rear wall 20, the latter being suitably extended, as indicated at 21—21, on each side, to function as a rear follower. Integral with the rear wall 20 is an interior forwardly extended hollow boss 22 which provides the means of retaining the bolt K and allows for the necessary longitudinal movement of the nut thereof during a compression stroke, as will be obvious from an inspection of the drawing.

Each of the side walls 17 of the friction shell is provided with notches or recesses 23 and 24, thus leaving between them a vertically extending rib 25 of relatively great width. Said rib 25 conforms to a corresponding recess 26 formed on the outer side of the wall 27 of the liner D, it being evident from the formation described, that the liners are thereby prevented from longitudinal movement relative to the shell when the liners are properly inserted. Each liner D is further provided with top and bottom, inwardly extending flanges 28—28, the latter functioning as guides and wearing surfaces for the movable friction elements. As best shown in Fig. 2, the flanges 28 are extended inwardly a distance slightly less than one-half of the interior width of the shell so as to facilitate insertion of the liners while at the same time providing a substantially complete guiding and wearing surface for the entire width of the shell when both liners are in place. The interior face 29 of the wall 27 of the liner constitutes a longitudinally extending friction surface proper of the shell and preferably the same is inclined inwardly and toward the center line of the shell so as to obtain a friction shell with opposed inwardly converging friction surfaces.

Each outer movable friction plate F has a main section 30, the inner and outer faces of which provide friction surfaces cooperating with the adjacent surfaces of the shell and stationary plate. The outer ends of the plates 30 are flanged as indicated at 31 and these flanges are preferably made integral so that a continuous smooth surface is provided at the outer end of the gear for the purpose hereinafter described.

Each of the stationary friction plates E has a main longitudinally extending section 32, the inner and outer faces of which provide longitudinally extending friction surfaces, and an outturned flange 33 at its inner end which seats against the corresponding shell shoulder 18. The shell is also additionally notched as indicated at 34, to receive the outer end of the flange 33 and thus restrain the plate E against outward movement during a release action. In a compression stroke, it is evident that the plates E are prevented from inward movement relative to the shell by the shoulders 18.

Each of the innermost movable friction plates G comprises a main elongated section 35, the outer face of which provides a friction surface cooperable with the corresponding adjacent friction plate E. Each plate G is further formed with an inwardly extended flange 36 at its outer end and a relatively narrow inturned flange 37 at its inner end. The flange 36 seats against the corresponding flange 31 and the flange 37, at the inner end of the plate G, bears upon the washer or spring follower 38 which in turn bears directly on the front end of the outer heavy coil spring unit C so that the latter functions to directly resist the inward movement of the plates G, as will be evident.

The pressure-transmitting wedge shoes H are of like construction and each has a wedge face 39 at its inner end and an outer longitudinally extended pressure face 40, the latter engaging the inner face of the corresponding plate G. Each member H is extended outwardly so that its end 41 normally bears against the corresponding flange 36 and hence the members H are adapted to directly receive the actuating pressure during a compression stroke.

The wedge spring cap J has a flat inner face 42 against which is seated the front end of the inner lighter coil spring unit B, the rear end of the latter being seated on the end of the boss 22 previously referred to. On its forward side, the member J has two wedge faces 43—43 which co-act with the wedge faces 39 of the shoes H. As clearly shown in the drawings, the wedge cap J is centrally apertured to accommodate the shank of the bolt K and the shoes H are suitably recessed as indicated at 44 to provide a pocket for the head of the bolt.

In operation, assuming a compression stroke in buff, it is evident that the plates F and G and the shoes H—H will all move inwardly simultaneously and uniformly, thus setting up a lateral pressure through the wedge member J which is yieldingly resisted by the spring unit B. The plates E remain stationary, as hereinbefore described. In addition to the friction created between the relatively movable friction surfaces, there is additional resistance furnished through the spring unit C which directly resists inward movement of the movable plates G. Due to the taper of the friction surfaces, there will be produced a slight differential action of the wedge cap J, the longitudinal movement of the latter being somewhat accelerated relative to the movement of the follower and movable plates. Upon removal of the actuating force, it is evident that an efficient release action is obtained, inasmuch as the spring unit C operates directly on the plates G tending to push the latter out. The capacity of the unit C being greater than the other spring unit B, the tendency will be to shift the plates G outwardly and thus remove the flanges 36 thereof from the outer ends 41 of the shoes H or at least reduce the resistance to the outward movement of the shoes H to such extent that the shoes may easily be projected outwardly under the action of the spring unit B.

It will be observed that the gear shown provides for a much longer compression stroke than gears heretofore generally used, the illustration being intended to indicate about a 5" compression stroke. Due to the long stroke, it is necessary that the movable parts project outwardly from the shell a corresponding amount, but I avoid any tendency to spread the mouth of the friction shell by reason of the fact that the wedge member J and the associated wedge sections of the shoes H are at all times located inwardly of the mouth of the shell and consequently the lateral pressure created during a compression stroke is always directed in lines normal to the friction surfaces at points inwardly of the mouth of the shell. As will be evident from an inspection of Fig. 2, the wear occasioned by the back and forth movements of the friction elements is taken by the flanges 28 of the liners, thus saving the friction shell and permitting renewal of the liners when the latter become worn, at a minimum expense.

As hereinbefore described, the two plates F—F are made with an integral transverse section 31. In assembling the shock absorbing device within the yoke, it is generally customary to insert the follower 13 last and by reason of having the integral section 31, there is no danger of shoulders or projections being encountered as the follower 13 is slipped in transversely. Further, by having the integral section 31, there is no danger of any plate ends gouging the follower, a difficulty encountered in many types of friction plate gears. It will further be noted that the corners where the section 31 unites with the main sections 30 of the plates F, are formed of relatively long radii so that flexing may take place at these corners as the plates F are forced inwardly of the slightly tapered shell, this flexing being readily accommodated by the correspondingly rounded corners of the plates G and the corner recessing at the outer ends of the wedge shoes H.

Although I have herein shown and described what I now consider the preferred manner of carrying out my invention, the same is merely illustrative and I contemplate all changes and modifications that come within the scope of the claims appended hereto.

I claim:

1. In a friction shock absorbing mechanism, the combination with a friction shell having opposed side walls and top and bottom walls; of opposed removable liners for said shell, each liner having a side wall provided with an inner friction surface and spaced guiding and wearing flanges extending inwardly at right angles from said wall and protecting the top and bottom walls of the shell; a spring resistance; stationary friction plates; movable friction plates; and wedge pressure-creating means, the flanges of said liners overhanging the pressure-creating means and the movable plates.

2. In a friction shock absorbing mechanism, the combination with a friction shell having interior shoulders; of stationary friction plates engaging said shoulders at their inner ends; a spring resistance; movable friction plates having flanged outer ends adapted to be directly actuated; wedge pressure-creating means interposed between the innermost movable friction plates; and means on said last named plates engaging the pressure-creating means to actuate the same.

3. In a friction shock absorbing mechanism, the combination with a friction shell having interior shoulders; of stationary friction plates engaging said shoulders at their inner ends; a spring resistance; movable friction plates having flanged outer ends adapted to be directly actuated; and wedge pressure-creating means interposed between the innermost movable friction plates, said wedge pressure creating means being engaged and actuated by the flanges of the innermost plates, said spring resistance comprising two spring units and said innermost movable friction plates having their inner ends directly resisted by one of said spring units.

4. In a friction shock absorbing mechanism, the combination with a friction shell; of stationary friction plates; movable friction plates intercalated with said stationary plates, all of said movable plates having laterally extended flanges at their outer ends adapted to directly receive the actuating force; a spring resistance; and wedge pressure-creating means disposed between the innermost movable plates, said means including pressure-transmitting wedge elements adapted to be directly actuated, at their outer ends, by the inturned flanges of said innermost movable friction plates.

5. In a friction shock absorbing mechanism, the combination with a friction shell having inwardly converged friction surfaces and provided with transversely extending interior shoulders; of stationary friction plates each having an outturned flange at its inner end seated against one of said shoulders; a pair of movable friction plates on each side of the center line, said plates having inturned flanges at their outer ends adapted to be directly actuated, the innermost movable plates having inturned flanges at their inner ends and being of greater length than the outermost movable plates; a spring unit directly cooperable with the inner ends of said elongated movable plates; lateral wedge pressure-creating means between the innermost movable plates, said means comprising two wedge pressure-transmitting elements and a wedge at the inner end thereof; and a second spring unit directly cooperable with said wedge, said wedge being always disposed completely within the mouth of the friction shell.

In witness that I claim the foregoing I have hereunto subscribed my name this 24th day of February, 1928.

JOHN F. O'CONNOR.